Dec. 30, 1941.  W. A. KOSKEN  2,267,794

SHUTTER MECHANISM FOR CAMERAS

Filed June 24, 1940  5 Sheets—Sheet 1

INVENTOR.
Wilho A. Kosken
BY
ATTORNEY.

Dec. 30, 1941.   W. A. KOSKEN   2,267,794
SHUTTER MECHANISM FOR CAMERAS
Filed June 24, 1940   5 Sheets-Sheet 2

INVENTOR.
Wicks A. Kosken
BY
ATTORNEY.

Dec. 30, 1941.  W. A. KOSKEN  2,267,794
SHUTTER MECHANISM FOR CAMERAS
Filed June 24, 1940  5 Sheets-Sheet 3

INVENTOR.
Wiedo A. Kosken
BY
ATTORNEY.

Dec. 30, 1941.  W. A. KOSKEN  2,267,794

SHUTTER MECHANISM FOR CAMERAS

Filed June 24, 1940   5 Sheets-Sheet 4

INVENTOR.
Wilho A Kosken
BY
ATTORNEY.

Dec. 30, 1941.  W. A. KOSKEN  2,267,794
SHUTTER MECHANISM FOR CAMERAS
Filed June 24, 1940   5 Sheets-Sheet 5
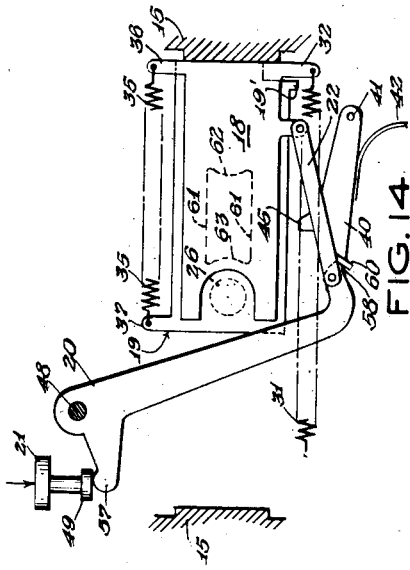

Patented Dec. 30, 1941

2,267,794

UNITED STATES PATENT OFFICE 2,267,794

SHUTTER MECHANISM FOR CAMERAS

Wilho A. Kosken, New York, N. Y., assignor to Universal Camera Corporation, New York, N. Y., a corporation of New York Application June 24, 1940, Serial No. 342,015

9 Claims. (Cl. 95—55)

This invention relates to camera shutter mechanism of a simplified and efficient construction.

In accordance with the present invention, a compact shutter arrangement is provided having a predetermined speed of exposure; the shutter broadly comprising two relatively slidable members operated from a linearly movable shutter knob.

The slidable members comprise a mask slide and exposure slide which are operated in a manner to permit the latter to expose the aperture at a predetermined rate and subsequently coact with the mask slide to return the shutter mechanism to its normal inoperative position without again exposing the aperture.

A linearly operated time exposure lever is provided to intercept the movement of the exposure slide at the exposure position when required.

Novel constructions of the shutter mechanism afford its insertion in a pre-molded casing, and assembly without rivets or screws.

Other advantages, features and capabilities of the present invention will become apparent in the following detailed description of a preferred embodiment thereof, taken in connection with the drawings, in which:

Figures 11 to 14 are diagrammatic representations of the shutter mechanism in different operating positions.

Figure 1:
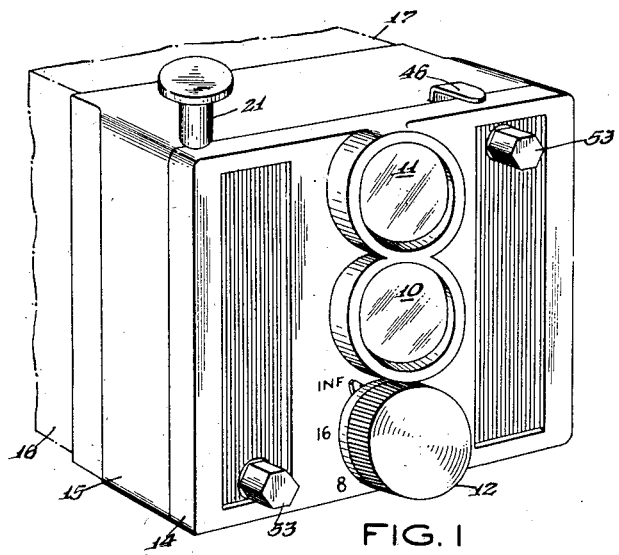
Figure 1 is a perspective view of the camera face including the shutter housing, showing the remainder of the camera in partial schematic form.
Figures 2, 3:
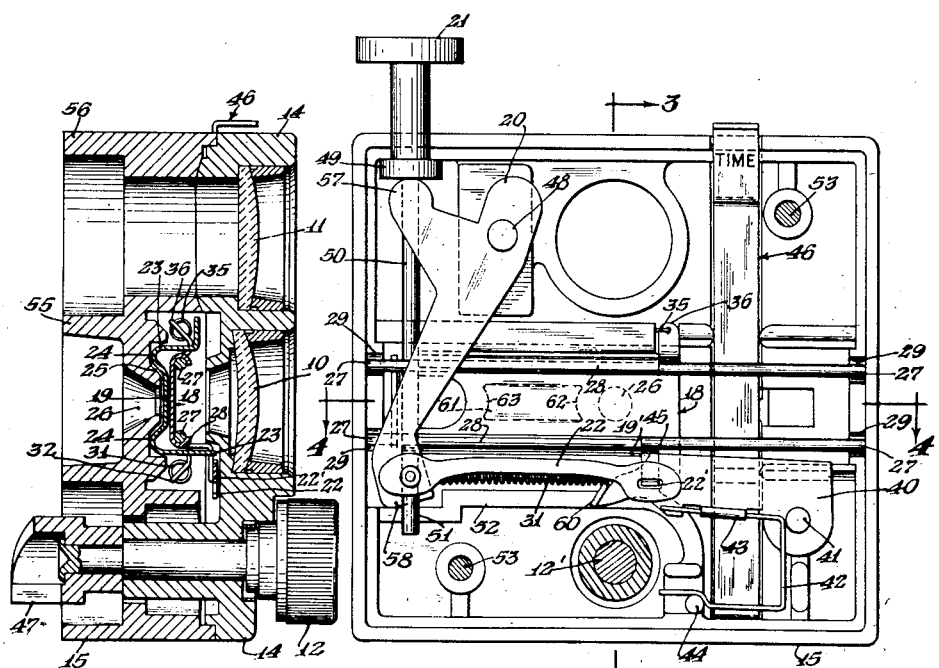
Figure 2 is a face view of the shutter mechanism in the neutral position with the front cover removed.
Figure 3 is a vertical cross-sectional view through the shutter mechanism as taken along the line 3—3 of Figure 2.
Figure 5:
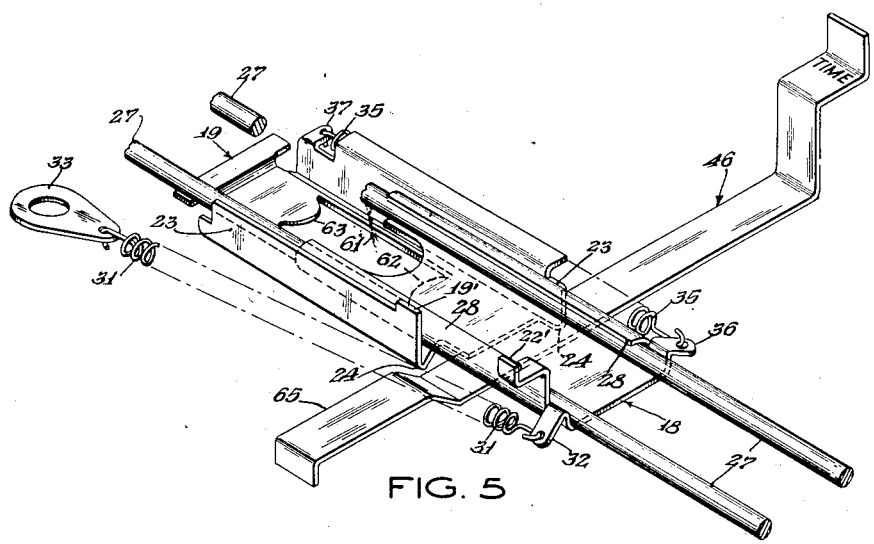
Figure 5 is an enlarged perspective showing of the shutter slide, and guiding arrangements thereof.
Figure 4:
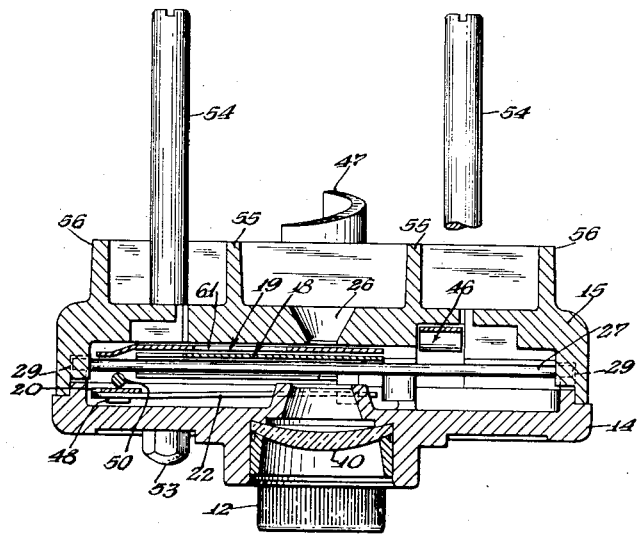
Figure 4 is a horizontal cross-sectional view through the shutter mechanism as taken along the line 4—4 of Figure 2.
Figure 7:
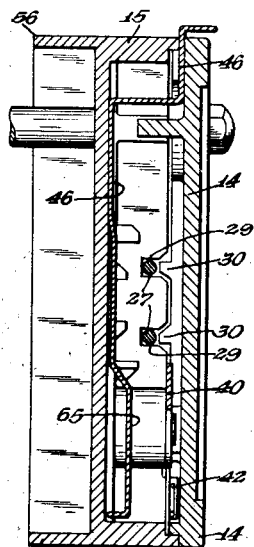
Figure 7 is a vertical cross-sectional view through the shutter mechanism and through the time slide as taken along the line 7—7 of Figure 6.
Figure 6:
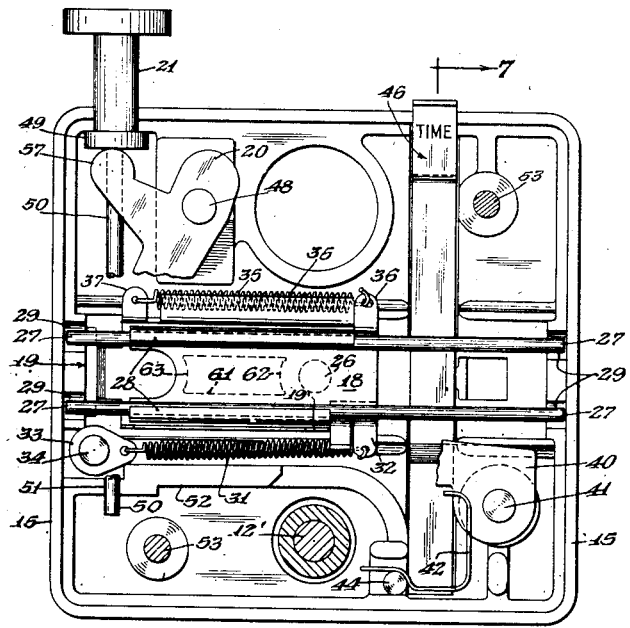
Figure 6 is an interior face view of the shutter mechanism similar to Figure 2, with the linked actuating levers broken away.

The shutter mechanism of this invention is particularly applicable for small cameras and permits a compact shutter compartment. In the perspective illustration of the shutter compartment, Figure 1, is shown the central photographic or objective lens 10 together with a focusing or viewing lens 11, and focusing knob 12 on opposite sides thereof. The shutter mechanism is enclosed in a main casing 15 having a cover plate 14. The shutter compartment is connected with the main camera body schematically indicated at 16 and is adjustable with respect thereto through focusing knob 12, the same being shown and described in detail, in a co-pending application Serial Number 346,490, in the name of Kosken and Brownscombe assigned to the same assignee as is the present case, wherein there is disclosed the novel focusing arrangement operable through the focusing knob employing the shutter mechanism of the present invention.

The viewing lens 11 projects a duplicate of the image which is to be photographed through lens 10 upon a mirror contained in the body of camera 16 behind lens 11. The mirror in turn projects the image on a viewing screen contained in upwardly extending camera section 17. The close juxtapositioning of lenses 10 and 11 made possible by the compact shutter slide arrangement to be described reduces the amount of parallax to render the twin lens reflex camera action more effective.

Figure 9:
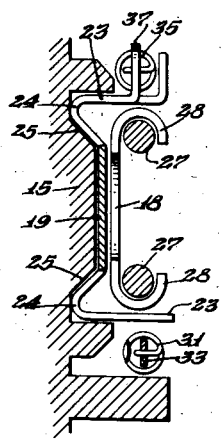
Figure 9 is an enlarged detailed view through the shutter slide arrangement taken along the line 9—9 of Figure 8.

The details of the preferrd shutter construction may be seen in Figures 2 to 7, in the neutral or inoperative position. The shutter mechanism essentially comprises a mask slide 18, an exposure slide 19, a pivoted shutter lever 20 controlled by a shutter knob 21 linked to mask slide 18 by shutter link 22 pivoted at one end to projection or lug 22' on mask slide 18 and at its other end to projection 20' on lever 20. Exposure slide 19 contains flanges 23, 23 and depending regions 24, 24. The base of exposure slide 19 together with its associated longitudinal channeled regions 24, 24 rides in a coacting cradle 25 of the casing 15 opposite a central aperture 26 thereof. Enlarged Figure 9 clearly illustrates this feature. Mask slide 18 is slidably positioned on the central base portion of exposure slide 19 by two parallel rods 27, 27. The longitudinal edges 28, 28 of mask slide 18 are grooved about rods 27 and are guided thereby. The ends of rods 27 fit into suitable grooves 29 in casing 15 and are firmly held therein when cover 14 is secured to casing 15 by suitable projections 30 thereof, as may be seen in Figure 7.

Mask slide 18 is spring biased to the neutral position by a spring 31, one end of which is connected to a lug 32 extending from slide 18, and the other end to a lug 33 fitted onto a post 34 of the casing. A second spring 35 is connected between opposed ends of slides 18 and 19 through lugs 36 and 37 respectively thereof.

A pawl 40 is pivoted about a post 41 in the casing and spring biased toward the shutter slides by pawl spring 42. Wire spring 42 presses against cup projection 43 of pawl 40. The opposite end of spring 42 presses against a post 44 of the casing. A projecting corner 45 of pawl 40 is arranged to normally be in the path of an upstanding end 19' along the lowermost of flange 23 on exposure slide 19 (see Figure 12) to arrest its movement toward the right to the exposure position while mask slide 18 is moved in that direction, as will be described in more detail hereinafter.

Time slide 46 is arranged to coact with the exposure slide when moved upwardly in a manner to be hereinafter described in connection with Figures 11 and 12. A cam 47 is attached to the end of rod 12' extending from focusing knob 12. Cam 47 coacts with a projection or cam follower within the camera body 16 to effect a simple focusing action by moving the shutter compartment 15 in the manner disclosed in my copending application, referred to hereinabove. Shutter lever 20 is pivotally mounted on a pin or post 48 projecting from casing 15. Shutter knob 21 contains a collar 49 which limits its upward movement by projecting against casing 15. The vertical movement of knob 21 is directed by a rod 50 extending therefrom into the shutter casing and guided by a slot 51 in a projecting rib 52 of the casing 15.

All the elements of the shutter mechanism illustrated and described are assembled by simply dropping them into the casing 15, molded with the corresponding ridges, projections, and slots for receiving and guiding them. The coacting cover 14 for casing body 15 is designed to press against the respective posts, slots and parts to keep the assembly in operative relation. No rivets or screws are employed in the linkage. The cover 15 containing lenses 10 and 11 with suitable apertures therefor is secured in position on casing 15 by screw members 53. Posts 54 extend from screw members 53 into the camera body 16. A rectangular baffle 55 extends from the rear of casing 15 about aperture 26 for coacting with corresponding baffles in the camera body 16. The outer edges of frame 15 project rearwardly to form a rim 56 which fits over a coacting body portion of the camera. The shutter mechanism is accordingly slidably related with the camera body, its position with respect thereto being adjustable by focusing knob 12 in the manner described in the copending application referred to.

Figure 8:
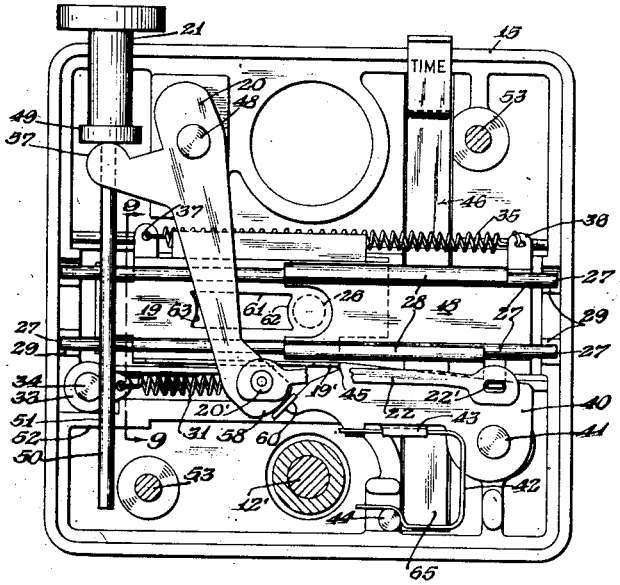
Figure 8 is an interior face view of the shutter mechanism with the shutter knob depressed to a position just before release of the exposure slide.

Figure 8 illustrates the relative positions of the components of the shutter mechanism when the shutter knob 21 is depressed to a position immediately preceding the release of the exposure slide. Lobe 57 of shutter lever 20 is pressed downwardly by collar 49 of shutter knob 21. Lever 20 is thereby rotated in a counter-clockwise direction moving link 22 and mask 18 toward the right as illustrated in Figure 8. Objective aperture 26 is shown in dotted in the center. Mask slide 18 when moved in the extreme right position shown, is clear of the aperture position at 26. However, a portion of the exposure slide 19 continues to mask aperture 26 to prevent light from entering to the unexposed film in the camera body. The tension of spring 35 biases exposure slide 19 to the right. However, the projection 45 of upwardly spring biased pawl 40 normally prevents the exposure slide from moving beyond the position illustrated in Figure 8. The end portion 58 of lever 20 is rounded or otherwise cammed to coact with an outwardly extending projection 60 of pawl 40. Projection 60 is inclined as shown. When lever end 58 abuts projection 60 of pawl 40, it dislodges projection 45 thereof from the edge of exposure slide 19 by moving pawl 40 against the biasing action of spring 42.

Figure 10:
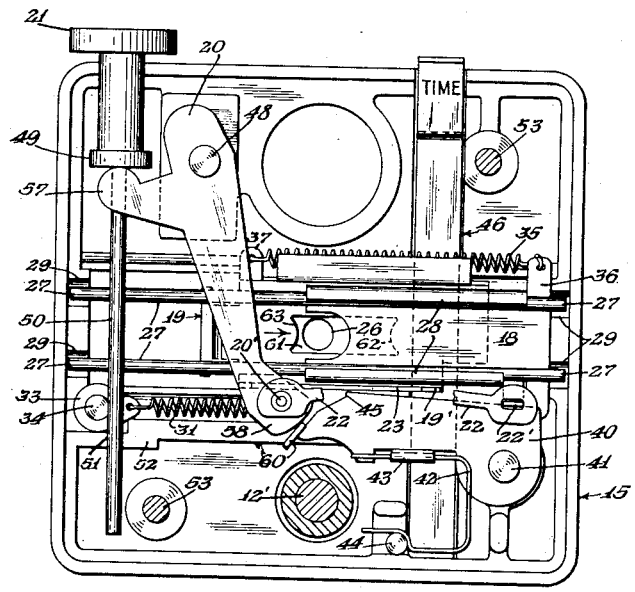
Figure 10 is an interior face view of the shutter mechanism with the shutter mechanism operated to the position with the exposure slide uncovering the aperture.

In Figure 10, push button 21 has been pressed all the way down carrying the end 58 of shutter lever 20 to its extreme right position wherein pawl 40 is displaced in a counter-clockwise direction through projecting lug 60 thereof. Spring 35, tensioned in the position of the shutter corresponding to Figure 8, moves exposure slide 19 rapidly to the right. The release of exposure slide 19 and its movement to the right exposes aperture 26 to light from the objective lens due to a central slotted opening 61 in exposure slide 19. The position of exposure slide 19 in Figure 10 corresponds to that between its release by pawl 40 and before reaching its extreme right position. The longitudinal ends 62, 63 of slot 61 are curved inwardly of the slot to increase the abruptness of admission and shutting off of the light to aperture 26. When left edge 63 of slotted opening 61 passes aperture 26, the exposure is completed.

While the speed of traverse of exposure slide 19 is predetermined by the design of the mechanical components thereof, particularly that of spring 35, the degree of exposure corresponding to the action of slide 19 depends upon the size and length of slotted opening 61 thereof as well as its speed of traverse after release by pawl 40.

The exposure timing for the shutter mechanism of the invention is constant and independent of the operator of the camera. The shutter knob 21 is essentially a trigger member setting off an abrupt movement of exposure slide 19, as soon as lever end 58 abuts pawl end 60. The exposure time is independent of the rate of downward movement of shutter knob 21.

Figures 11 to 14 are simplified schematic representations of the action of the slide members 18 and 19 for effecting the instantaneous exposure. Figure 11 corresponds to the neutral position of the shutter mechanism with shutter knob 21 in its uppermost position. This position corresponds to that illustrated in Figures 2 and 6. The left edge of exposure slide 19 abuts the left wall of casing 15 due to the action of spring 31. Lever 20 is in its neutral position with lobe 57 thereof holding shutter knob 21 in its uppermost position. In Figure 12 the shutter knob 21 is partially depressed, moving mask slide 18 to the right through lever 20 and link 22. A tip 19' in exposure slide 19 abuts projection 45 of pawl 40 biased upwardly by spring 42. The position of the shutter mechanism illustrated by Figure 12 corresponds to that shown in Figure 8. Camera aperture 26 remains unexposed on account of the opaque portion of exposure slide 19.

In Figure 13, shutter knob 21 has been depressed to its lowest position carrying lever 20 counter-clockwise to its extreme position, abutting projection 60 of pawl 40 to release projection 45 thereof from holding exposure slide 19. Slotted opening 61 of exposure slide 19 is opposite camera aperture 26 in the illustrated position effecting exposure of the film. The movement of exposure slide 19 is rapid due to the tension by spring 35. The exposure through aperture 26 is of relatively short duration due to the rapid movement of slide 19. The right edge of slide 18 abuts the right wall of casing 15 and slide 19 moves to the right until its right edge also abuts wall 15, as shown in Figure 14. Aperture 26 in Figure 14 is completely masked by an opaque portion of exposure slide 19. When pressure on shutter knob 21 is released, spring 31 pulls masked slide 18 back to its neutral left position shown in Figures 2, 6 and 11. The upwardly extending flanges 23 of exposure slide 19 abut projecting lugs 22' and 36 at the right end of masked slide 18, carrying masked slide 19 back to the left in unison with slide 18. This action prevents reexposure of aperture 26 for the single depression of shutter knob 21, since slotted opening 61 is masked by the opaque portion of masked slide 18 in its retraverse to the neutral position. The cycle of exposure is then completed and is in readiness for the successive operation thereof.

It will now be evident that the arrangement of the slide mechanism on the present invention comprises a minimum number of components to effect the instantaneous exposure actuation independent of the rate of depression of the shutter knob. The novel shutter arrangement is confined to narrow longitudinal dimensions to permit the juxtapositioning of the focusing lens 11 with the objective lens 10 thereby reducing the effective parallax. Also, the focusing knob 12 is adacent objective lens 10 to permit a closely compact shutter and lens compartment design. The avoidance of rivets and screws, and the projection of posts, slots, and ridges in the molded casing affords an inexpensive, reliable and serviceable shutter construction. The whole assembly is retained in operative relation by the simple expedient of attaching the casing cover containing coacting projections, as previously described.

Figures 15, 16:
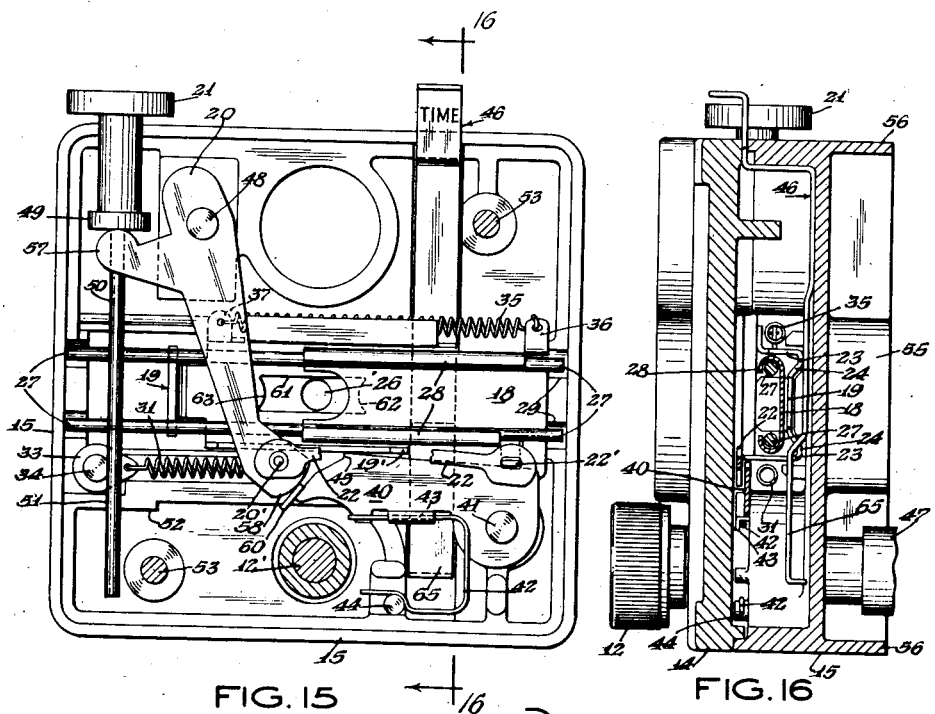
Figure 15 is an interior face view of the shutter mechanism with the time slide effective to arrest the exposure slide for a time exposure.
Figure 16 is a vertical cross-sectional view through the time slide of Figure 15 taken along the line 16—16 thereof.

A time exposure is readily effected with the shutter mechanism of the invention through time slide 46. Figures 15 and 16 illustrate the position of the shutter mechanism during the time exposure, with the shutter button 21 fully depressed. The action of shutter lever 20, link 22, and mask slide 18 is similar to that previously described. When lever end 58 abuts pawl end 60, mask slide 19 is released, moving to the right under the action of tension spring 35. The movement of exposure slide 19 to the right is arrested through a platform 65 near the bottom of slide 46, which abuts the walls of one of the channels 24 of exposure slide 19 as clearly shown in Figure 16. Exposure slide 19 is held with its slotted opening 61 opposite aperture 26 while shutter knob 21 is in the downward position illustrated. The time exposure is effective until the pressure of knob 21 is released to permit spring 31 to return slide 18 towards the left to mask aperture 26 and carry exposure slide 19 back to its neutral left position when lugs 22', 36 abut slide 19 in a manner previously described. The time exposure is effected essentially by limiting the excursion of slide 19 to the right through a projection interposed in its path by the raising of time slide 46 to the position illustrated in Figures 15 and 16.

Although a preferred embodiment has been described for carrying out the principles of the present invention, it is to be understood that modifications are feasible without departing from the broader spirit and scope of the invention as expressed in the appended claims.

What I claim is:

1. Shutter mechanism for a camera comprising a mask slide and an exposure slide having an opening, said slides being arranged for movement with respect to each other opposite the film exposing aperture of the camera; a spring connecting said slides; apparatus for moving said mask slide past said aperture, said spring urging said exposure slide towards said mask slide; a member biased towards said slides for arresting the movement of said exposure slide before its opening reaches the aperture whereby a predetermined force is imparted to said exposure slide in the aperture exposing direction; and means arranged to release said member from said exposure slide permitting said spring to move said exposure slide opening past said aperture and effect an exposure of predetermined duration.

2. Shutter mechanism for a camera comprising a mask slide and an exposure slide having an opening, said slides being arranged for movement opposite the film exposing aperture of the camera; a spring connecting said slides; apparatus for moving said mask slide past said aperture including a shutter knob and a lever, said spring urging said exposure slide towards said mask slide; a member having a projection biased towards said exposure slide for arresting the movement thereof before its opening reaches said aperture, whereby a predetermined force is imparted to said exposure slide in the aperture exposing direction by said spring; said lever abutting said member when said shutter knob is depressed to release said member from said exposure slide permitting said spring to move said exposure slide opening past said aperture and effect an exposure of predetermined duration.

3. Shutter mechanism for a camera comprising a mask slide and an exposure slide having a slotted opening, said slides being arranged for movement opposite the film exposing aperture of the camera; a first spring connecting said slides; a second spring connected to said mask slide for biasing it to the neutral position; apparatus for moving said mask slide past said aperture including a shutter knob and a lever, said first spring urging said exposure slide towards said mask slide; a pawl having a projection biased towards a part of said exposure slide for arresting the movement thereof before its opening reaches said aperture, whereby a predetermined force is imparted to said exposure slide in the aperture exposing direction by said first spring; said lever abutting said pawl when said shutter knob is depressed to release said pawl from said exposure slide permitting said first spring to rapidly move said exposure slide opening past said aperture and effect an exposure of predetermined duration.

4. Shutter mechanism for a camera comprising a mask slide and an exposure slide having a slotted opening, said slides being arranged for movement opposite the film exposing aperture of the camera in a linear path with respect to each other; a first spring connecting opposite edges of said slides; a second spring connected to said mask slide for biasing it to the neutral position; apparatus for moving said mask slide past said aperture including a linearly displaceable shutter knob, a pivoted lever having a portion abutting said knob and a link connecting said lever with said mask slide, said first spring urging said exposure slide towards said mask slide; a pawl, having a projection spring biased towards a part of said exposure slide for arresting the movement thereof before its opening reaches said aperture, whereby a predetermined force is imparted to said exposure slide in the aperture exposing direction by said first spring; an end of said lever abutting a projection of said pawl when said shutter knob is depressed to unlatch said pawl and said exposure slide permitting said first spring to rapidly move said exposure slide spring past said aperture and effect an exposure of predetermination.

5. Shutter mechanism for a camera comprising a mask slide and an exposure slide having an opening, said slides being arranged for movement with respect to each other; a spring connecting said slides; apparatus for moving said mask slide past said aperture, said spring urging said exposure slide towards said mask slide; a member biased towards said slides for arresting the movement of said exposure slide before its opening reaches said aperture, whereby a predetermined force is imparted to said exposure slide in the aperture exposing direction; and means arranged to release said member from said exposure slide permitting said spring to move said exposure slide opening past said aperture and effect an exposure of predetermined duration; a section of said mask slide abutting said exposure slide after the exposure for carrying said exposure slide therewith to the neutral position upon the release of said shutter knob.

6. Shutter mechanism for a camera comprising a mask slide and an exposure slide having a longitudinal slotted opening, said slides being arranged for movement opposite the film exposing aperture of the camera; a first spring connecting said slides; a second spring connected to said mask slides for biasing it to the neutral position; apparatus for moving said mask slide past said aperture including a linearly displaceable shutter knob and a lever, said first spring urging said exposure slide towards said mask slide; a pawl having a projection spring biased towards a part of said exposure slide for arresting the movement thereof before its opening reaches said aperture, whereby a predetermined force is imparted to said exposure slide in the aperture exposing direction by said first spring; said lever abutting said pawl when said shutter knob is depressed to release said pawl from said exposure slide permitting said first spring to rapidly move said exposure slide opening past said aperture and effect an exposure of predetermined duration; a section of said mask slide abutting said exposure slide after the exposure for cojointly carrying said exposure slide therewith under the action of said second spring back to the neutral position upon the release of said shutter knob with said mask slide masking said exposure slide opening.

7. Shutter mechanism for a camera comprising a mask slide and an exposure slide having an opening, said slides being arranged for movement with respect to each other opposite the film exposing aperture of the comera; a spring connecting said slides; apparatus for moving said mask slide past said aperture, said spring urging said exposure slide towards said mask slide; a member biased towards said slides for arresting the movement of said exposure slide before its opening reaches said aperture whereby a predetermined force is imparted to said exposure slide in the aperture exposing direction; and means arranged to release said member from said exposure slide permitting said spring to move said exposure slide opening towards said aperture; a time slide having a part thereof arranged to arrest the movement of said exposure slide in a position wherein the opening thereof is opposite said aperture.

8. Shutter mechanism for a camera comprising a mask slide and an exposure slide having an opening, said slides being arranged for movement opposite the film exposing aperture of the camera; a spring connecting said slides; apparatus for moving said mask slide past said aperture including a shutter knob and a lever, said spring urging said exposure slide towards said mask slide; a member having a projection biased towards said exposure slide for arresting the movement thereof before its opening reaches said aperture, whereby a predetermined force is imparted to said exposure slide in the aperture exposing direction by said spring; said lever abutting said member when said shutter knob is depressed to release said member from said exposure slide permitting said spring to rapidly move said exposure slide opening towards said aperture; a time slide having a part thereof arranged to arrest the movement of said exposure slide in a position wherein the opening thereof is opposite said aperture; a section of said mask slide abutting said exposure slide for carrying said exposure slide therewith back to the neutral position upon the release of said shutter knob.

9. Shutter mechanism for a camera comprising a mask slide and an exposure slide having a longitudinal slotted opening, said slides being arranged for movement opposite the film exposing aperture of the camera; a first spring connecting said slides; a second spring connected to said mask slide for biasing it to the neutral position; apparatus for moving said mask slide past said aperture including a linearly displaceable shutter knob and a lever, said first spring urging said exposure slide towards said mask slide; a pawl having a projection spring biased towards a part of said exposure slide for arresting the movement thereof before its opening reaches said aperture whereby a predetermined force is imparted to said exposure slide in the aperture exposing direction by said first spring; said lever abutting said pawl when said shutter knob is depressed to release said pawl from said exposure slide permitting said first spring to rapidly move said exposure slide opening towards said aperture; a linearly operable time slide having a part thereof arranged to arrest the movement of said exposure slide in a position wherein the opening thereof is opposite said aperture; a section of said mask slide abutting said exposure slide for carrying said exposure slide therewith under the action of said second spring back to the neutral position upon the release of said shutter knob.

WILHO A. KOSKEN.